United States Patent
Kakinuma et al.

(10) Patent No.: US 11,461,903 B2
(45) Date of Patent: Oct. 4, 2022

(54) VIDEO PROCESSING DEVICE, VIDEO PROCESSING METHOD, AND VIDEO PROCESSING PROGRAM

(71) Applicant: Nippon Telegraph and Telephone Corporation, Tokyo (JP)

(72) Inventors: Hirokazu Kakinuma, Musashino (JP); Yoshihide Tonomura, Musashino (JP); Hiromu Miyashita, Musashino (JP); Hidenobu Nagata, Musashino (JP); Kota Hidaka, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 9 days.

(21) Appl. No.: 17/056,995

(22) PCT Filed: May 23, 2019

(86) PCT No.: PCT/JP2019/020423
§ 371 (c)(1),
(2) Date: Nov. 19, 2020

(87) PCT Pub. No.: WO2019/225692
PCT Pub. Date: Nov. 28, 2019

(65) Prior Publication Data
US 2021/0158534 A1    May 27, 2021

(30) Foreign Application Priority Data

May 24, 2018    (JP) .............................. JP2018-099678

(51) Int. Cl.
*G06T 7/194*    (2017.01)
*G06T 7/11*    (2017.01)
(Continued)

(52) U.S. Cl.
CPC ................ *G06T 7/194* (2017.01); *G06F 1/03* (2013.01); *G06N 3/08* (2013.01); *G06T 7/11* (2017.01);
(Continued)

(58) Field of Classification Search
CPC .. G06F 1/03; G06N 3/08; G06N 20/10; G06T 2207/20081; G06T 2207/20084;
(Continued)

(56) References Cited

U.S. PATENT DOCUMENTS

| 5,748,775 A | 5/1998 | Tsuchikawa et al. |
| 8,861,881 B2 * | 10/2014 | Tate ........................ G06T 5/005 382/284 |

(Continued)

FOREIGN PATENT DOCUMENTS

JP    3123587    10/2000

OTHER PUBLICATIONS

Kakinuma et al., "Real-time Image Segmentation using Machine Learning Techniques for 4K Video," NTT Service Evolution Laboratories, 2017 Winter Congress of the Society of Image Information and Media, Dec. 13, 2017, 5 pages (with English Translation).

(Continued)

*Primary Examiner* — Bobbak Safaipour
(74) *Attorney, Agent, or Firm* — Fish & Richardson P.C.

(57) ABSTRACT

Accurate and rapid identification can be performed even when feature vectors of input pixels and background pixels are close. An image processing device includes: a feature extractor which extracts features of pixels from an input image and an input image of a different time; a quantization unit which reduces the number of gradations of features extracted by the feature extractor; a learning unit 107 which learns combinations of the features of pixels through a machine learning algorithm that performs nonlinear identi- (Continued)

fication and constructs a network according to machine learning; an LUT generator 109 which generates an LUT that replaces arithmetic operations of the network constructed by the learning unit 107; a foreground region estimator 103 which rapidly estimates similarity of each pixel of the input image to a foreground by referring to the LUT generated by the LUT generator 109; and a boundary corrector 121 which classifies regions similar to the foreground estimated by the foreground region estimator 103 into the foreground, a background, and an unclassified region including boundary pixels of the foreground and the background and performs boundary correction only on the unclassified region.

11 Claims, 14 Drawing Sheets

(51) Int. Cl.
  *G06T 7/174*  (2017.01)
  *G06K 9/46*  (2006.01)
  *G06F 1/03*  (2006.01)
  *G06N 3/08*  (2006.01)
  *G06V 10/40*  (2022.01)
(52) U.S. Cl.
  CPC .............. *G06T 7/174* (2017.01); *G06V 10/40* (2022.01); *G06T 2207/20081* (2013.01); *G06T 2207/20084* (2013.01)

(58) Field of Classification Search
  CPC ........... G06T 7/11; G06T 7/174; G06T 7/194; G06K 9/6232; G06K 9/6271; G06V 10/25; G06V 10/26; G06V 10/28; G06V 10/40; G06V 10/44; G06V 10/82; Y02P 20/584
  See application file for complete search history.

(56) References Cited

U.S. PATENT DOCUMENTS

| | | | | |
|---|---|---|---|---|
| 11,055,828 | B2* | 7/2021 | Long | G06K 9/6272 |
| 11,176,419 | B1* | 11/2021 | Chen | G06K 9/6232 |
| 11,195,057 | B2* | 12/2021 | Zadeh | G06K 9/6264 |
| 2012/0045095 | A1* | 2/2012 | Tate | G06T 7/75 |
| | | | | 382/103 |
| 2015/0213611 | A1* | 7/2015 | Dai | G06T 7/194 |
| | | | | 382/199 |
| 2022/0076071 | A1* | 3/2022 | Hiasa | G06K 9/6257 |

OTHER PUBLICATIONS

Kato et al., "Integration between Background Subtraction and Color Detection based on Nearest neighbor Classifier," Information Processing Society of Japan Research Report, 2004, 2004(6):31-36, 13 pages (with English Translation).

* cited by examiner (a)

IMAGED SCENE
(INPUT IMAGE)

(b)

REFERENCE LUT DESIGNATION IMAGE

Fig. 9

| | | | | | | |
|---|---|---|---|---|---|---|
| FIRST ROW | 0 | 0 | 0 | 0 | 0 | 0 |
| SECOND ROW | 0 | 0 | 0 | 0 | 0 | 1 |
| THIRD ROW | 0 | 0 | 0 | 0 | 0 | 2 |
| ⋮ | ⋮ | | | | | |
| 256-TH ROW | 0 | 0 | 0 | 0 | 0 | 255 |
| 257-TH ROW | 0 | 0 | 0 | 0 | 1 | 0 |
| ⋮ | ⋮ | | | | | |
| 281,474,976,710,655-TH ROW | 255 | 255 | 255 | 255 | 255 | 254 |
| 281,474,976,710,656-TH ROW | 255 | 255 | 255 | 255 | 255 | 255 |

Fig. 10

| | | | | | | |
|---|---|---|---|---|---|---|
| FIRST ROW | 0 | 0 | 0 | 0 | 0 | 0 |
| SECOND ROW | 0 | 0 | 0 | 0 | 0 | 1 |
| THIRD ROW | 0 | 0 | 0 | 0 | 0 | 2 |
| ⋮ | | | ⋮ | | | |
| THIRTY-SECOND ROW | 0 | 0 | 0 | 0 | 0 | 31 |
| THIRTY-THIRD ROW | 0 | 0 | 0 | 0 | 1 | 0 |
| ⋮ | | | ⋮ | | | |
| 1,073,741,823-TH ROW | 31 | 31 | 31 | 31 | 31 | 30 |
| 1,073,741,824-TH ROW | 31 | 31 | 31 | 31 | 31 | 31 |

VIDEO PROCESSING DEVICE, VIDEO PROCESSING METHOD, AND VIDEO PROCESSING PROGRAM

CROSS-REFERENCE TO RELATED APPLICATIONS

This application is a National Stage application under 35 U.S.C. § 371 of International Application No. PCT/JP2019/020423, having an International Filing Date of May 23, 2019, which claims priority to Japanese Application Serial No. 2018-099678, filed on May 24, 2018. The disclosure of the prior application is considered part of the disclosure of this application, and is incorporated in its entirety into this application.

TECHNICAL FIELD

The present invention relates to an image processing device, an image processing method, and an image processing program, and particularly, to a technology of separating subjects in a background and a foreground in an image using machine learning.

BACKGROUND ART

There is a background difference method (PTL 1) as a method of extracting an arbitrary region from an image of an arbitrary background. The background difference method is a method of extracting only a changed region from a time at which a background image has been acquired using a difference between a feature vector (color, distance, and the like) of the background image captured in advance and a feature vector of an input image, and can be used to rapidly extract a region through relatively simple processing.

However, in a general imaging situation, a region that is not correctly extracted (e.g., clothes of a subject having a color similar to the color of a background) or a region that is erroneously extracted (e.g., a shadow at the subject's feet) appears even when the background difference method using a simple threshold value is applied and thus it is difficult to correctly extract only an arbitrary region as expected. Accordingly, a method of flexibly setting a threshold value and identifying a foreground and a background with higher accuracy on the basis of the background difference method by training a nearest neighbor classifier using teacher data has been proposed (NPL 1).

CITATION LIST

Patent Literature

[PTL 1] Japanese Patent No. 3123587

Non Patent Literature

[NPL1] Takekazu Kato, Tomoyuki Shibata, Toshikazu Wada, "Integration between Background Subtraction and Color Detection based on Nearest Neighbor Classifier", IPSJ SIG Technical Report CVIM 2004. 6 (2003-CVIM-142) (2004), pp. 31-36

SUMMARY OF THE INVENTION

Technical Problem

In the background difference method, it is basically necessary to calculate differences between feature vectors (e.g., three values of R, G and B) of pixels of an input image (referred to as input pixels) and feature vectors of pixels of a background image (referred to as background pixels) and then set a threshold value for determining a foreground on the basis of the differences. However, in general imaging situations in which a green screen or a blue screen is not used, there are many pixels having only small feature vector differences between a foreground and a background and a threshold value by which the foreground can be separated from the background is limited to a narrow range. Simultaneously, since an insignificant change in a background is more easily presented as noise in a foreground as the threshold value is set more delicately, it is difficult to separate the foreground from the background simply using a uniform threshold value for the entire image. Although it is ideally desirable to set different threshold values for feature vectors of input pixels and background pixels, the number of combinations increases and optimal threshold values may differ according to coordinates even for one set of feature vectors, and thus fully optimized threshold values cannot be simply determined.

In a method using the nearest neighbor classifier, combinations of colors of pixels of an input, image and a background image are used in learning and optimal identification planes of a foreground and a background in a feature space are obtained. Accordingly, accuracy is improved more than in the background difference method using simple threshold value setting. However, since given feature vectors are identified linearly in this method, feature vectors of input pixels and background pixels are close and it is difficult to perform identification when a vector distribution in the feature space is complicated. Furthermore, it is also necessary to reduce a processing time required for identification to realize real-time processing of an image with a high resolution and a high frame rate.

An object of the present invention devised in view of such circumstances is to provide an image processing device, an image processing method, and an image processing program which can perform accurate and rapid identification even when feature vectors of input pixels and background pixels are close.

Means for Solving the Problem

To accomplish the aforementioned object, the invention according to a first aspect is an image processing device including: a feature extractor which extracts features of pixels from an input image and an input image of a different time; a quantization unit which reduces the number of gradations of features extracted by the feature extractor; a learning unit which learns combinations of the features of pixels through a machine learning algorithm that performs nonlinear identification and constructs a network according to machine learning; a look-up table (LUT) generator which generates an LUT that replaces arithmetic operations of the network constructed by the learning unit; a foreground region estimator which estimates similarity of each pixel of an input image to a foreground by referring to the LUT generated by the LUT generator; and a boundary corrector which classifies regions similar to the foreground estimated by the foreground region estimator into the foreground, a background, and an unclassified region including boundary pixels of the foreground and the background and performs boundary correction only on the unclassified region.

In the invention according to a second aspect, the quantization unit changes quantization methods according to features of the input image in the invention according to the first aspect.

In the invention according to a third aspect, the boundary corrector classifies regions similar to the foreground estimated by the foreground region estimator into the foreground, the background, and the unclassified region including the boundary pixels of the foreground and the background, further classifies the unclassified region into two or more types of correction target regions according to features near the boundary pixels, and changes correction methods for the correction target regions in the invention according to the first or second aspect.

In the invention according to a fourth aspect, the feature extractor automatically or semi-automatically corrects any of the input image and the input image of the different time or replaces the input image of the different time with another image obtained by editing the input image of the different time in the invention according to any one of the first to third aspects.

In the invention according to a fifth aspect, the learning unit constructs a plurality of types of networks having different properties by setting different machine learning algorithms or different machine learning parameters, the LUT generator generates a plurality of types of LUTs from the plurality of types of networks, and the foreground region estimator refers to different LUTs for regions of a preset image in the invention according to any one of the first to fourth aspects.

The invention according to a sixth aspect is an image processing method including, by a computer: a feature extraction step of extracting features of pixels from an input image and an input image of a different time; a quantization step of reducing the number of gradations of features extracted in the feature extraction step; a learning step of learning combinations of the features of the pixels through a machine learning algorithm that performs nonlinear identification and constructing a network according to machine learning; an LUT generation step of generating an LUT that replaces arithmetic operations of the network constructed in the learning step; a foreground region estimation step of estimating similarity of each pixel of the input image to a foreground by referring to the LUT generated in the LUT generation step; and a boundary correction step of classifying regions similar to the foreground estimated in the foreground region estimation step into the foreground, a background, and an unclassified region including boundary pixels of the foreground and the background and performing boundary correction only on the unclassified region.

The invention according to a seventh aspect is an image processing program causing a computer to serve as each functional unit according to any one of the first to fifth aspects.

Effects of the Invention

According to the present invention, it is possible to provide an image processing device, an image processing method, and an image processing program which can perform accurate and rapid identification even when feature vectors of input pixels and background pixels are close.

BRIEF DESCRIPTION OF DRAWINGS

FIG. 9 is an explanatory diagram of index generation processing in an embodiment of the present invention.

FIG. 10 is an explanatory diagram of index generation processing in an embodiment of the present invention.

DESCRIPTION OF EMBODIMENTS

Hereinafter, an embodiment of the present invention will be described with reference to the drawings. The same or similar parts are denoted by the same or similar symbols in the following description of the drawings.

<Overview>

In an embodiment of the present invention, an image processing device learns combinations of colors of pixels of an input image and a background image using a neural network (NN) and estimates similarity of each pixel to a foreground such that accurate identification can be performed even when feature vectors are close. Here, the NN has characteristics that it can perform conversion of a feature space and then estimate similarity of each pixel to a foreground. Further, real-time processing can be performed on a moving image by replacing arithmetic operation processing of the constructed NN with look-up table (LUT) reference processing. Further, it is possible to perform rapid processing while precisely correcting the boundary of a subject by sparsely searching for neighbor pixels close to the color of a target pixel and re-identifying whether the pixels are a foreground or a background one by one with respect to the boundary region of an extracted region. In addition, it is possible to perform rapid processing while precisely correcting the boundary of the subject by performing the same processing on pixels of a region in which it is ambiguous whether they correspond to the foreground or the background.

Processing in an embodiment of the present invention is divided into learning processing and extraction processing. The learning processing is pre-processing and the extraction processing is real-time processing. Hereinafter, each type of processing will be described in detail with reference to the drawings.

<Learning Processing>

Figure 1:
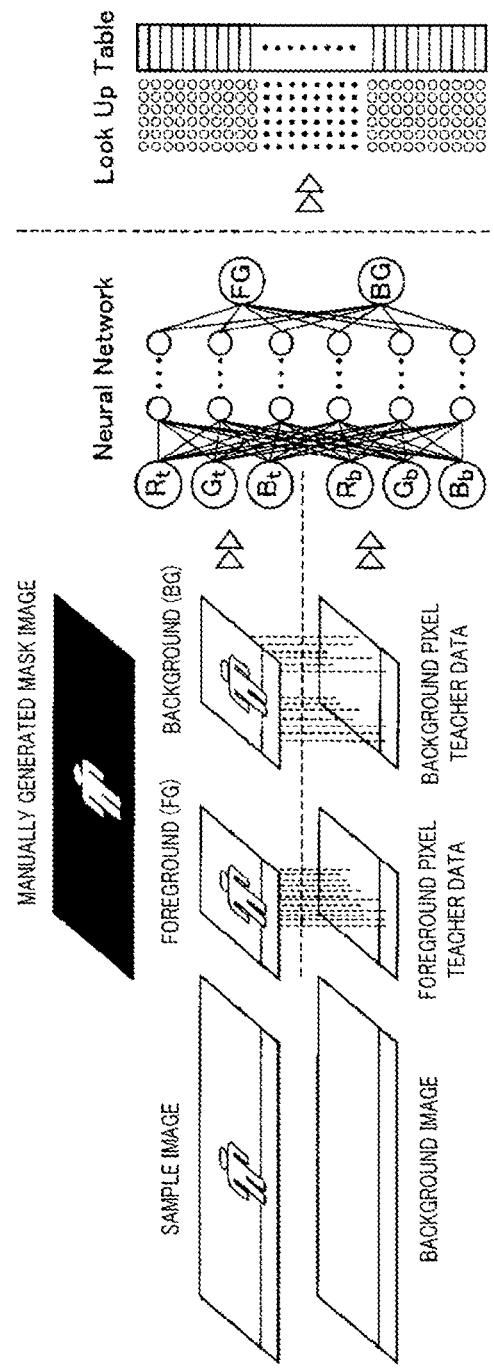
FIG. 1 is an explanatory diagram of learning processing in an embodiment of the present invention.

FIG. 1 is an explanatory diagram of the learning processing (pre-processing) in an embodiment of the present invention. As shown in this figure, the following processes 1-1 to 1-6 are performed in the learning processing.

In the process 1-1, an image input from a camera when a subject is not included in the image is acquired in advance as a background image.

In the process 1-2, an image input from the camera is acquired as a sample image, and a mask image obtained by manually cutting out the subject region is generated (white: subject in a foreground, black: background).

In the process 1-3, combinations of features of pixels of the sample image and the background images (feature vectors of a total of 6 dimensions) are set as teacher data of foreground pixels with respect to coordinates corresponding to the foreground of the generated mask.

In the process 1-4, combinations of features of pixels of the sample image and the background images (feature vectors of a total of 6 dimensions) are set as teacher data of background pixels with respect to coordinates corresponding to the background of the generated mask. The NN is caused to learn the teacher data using the 6-dimensional feature vectors of the teacher data as inputs and using probabilities that combinations thereof correspond to the foreground or the background as outputs.

In the process 1-5, when there are a plurality of sample images (learning data), the processes 1-2 to 1-4 are repeated for each of sample images.

In the process 1-6, since arithmetic operation processing of the NN takes time and is not suitable for real-time processing for a moving image, a relationship between inputs and outputs of the NN is made into an LUT. Specifically, the relationship between inputs and outputs is made into a table by inputting all combinations of the 6-dimensional feature vectors to the NN and acquiring outputs associated therewith.

—Supplement—

Since features of an image basically assume color information, 1 pixel has a 3-dimensional feature vector. As a specific variation, "pixel values R, G and B of an 8-bit RGB image", "pixel values H, S and V of an 8-bit HSV image", "pixel values Y, U and V of a 10-bit YUV image" and the like can be conceived. For example, it is assumed that a 6-dimensional feature vector is $R_f$, $G_f$, $B_f$, $R_b$, $G_b$, and $B_b$ having pixels values of 0 so 255 (8 bits). In this case, although the number of combinations of all colors is $256^{\wedge}6$, the table having this data size is too large to be handled on a memory of today's general calculators. Accordingly, a pixel value of each color is quantized into $32^{\wedge}6$ of 0 to 31 (6 bits), or the like to generate an LUT having a data size that can be practically handled. As a specific example of quantization, in the case of an image having 256 gradations of 0 to 255, all pixel values may be divided by 8 such that the image has 32 gradations of 0 to 31 at equal intervals.

Meanwhile, the number of dimensions and the number of gradations can be flexibly changed according to a size that can be handled in a system and a target situation and 6-dimensional 32-gradation feature vectors are not essentially required. Specifically, a background image may be converted into gray scales such that it has 4-dimensional 128-gradation feature vectors ($R_f$, $G_f$, $B_f$, $Gray_b$). Further, 5-dimensional 64-gradation feature vectors ($R_f$, $G_f$, $B_f$, $H_b$, $V_b$) may be acquired with reference to only the hue and brightness of the background image. In this manner, it is possible to generate an LUT by learning combinations of different types of feature quantities. Furthermore, when a background of a scene drastically changes, for example, it is conceivable that it may be difficult to obtain the effect of background differences and many background pixels may appear as foreground pixels. Accordingly, it is also possible to generate an LUT for identifying a foreground or a background using only input pixels by learning only 3-dimensional 128-gradation feature vectors ($R_f$, $G_f$, $B_f$) without learning background pixels.

Furthermore, an LUT to be referred is not necessarily of one type in extraction processing which will be described later and a plurality of different LUTs may be referred to for regions of an image. For example, a case in which a scene includes a region having little color change in background pixels (a region of the ground at the lower part of an image) and a region having considerable color change in background pixels (a region of the sky at the upper part of the image) is conceivable. In this case, it is possible to obtain identification results in accordance with features of the scene by dividing the scene such that an LUT that is a result of learning using 6-dimensional 32-gradation feature vectors is referred for the lower region of the image and an LUT that is a result of learning using 3-dimensional 128-gradation feature vectors is referred for the upper region of the image.

Figure 2:
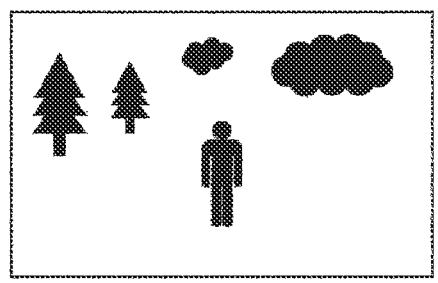
FIG. 2 is an explanatory diagram of a case in which a plurality of LUTs are used in an embodiment of the present invention.
Figure 2:
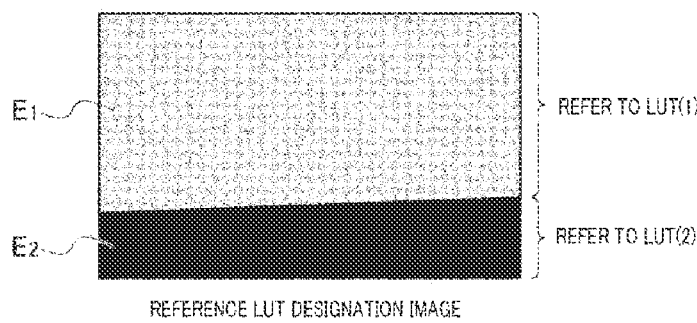

In this manner, when a plurality of LUTs for reference are used, it is necessary to prepare data representing which pixel refers to which LUT (a table in which coordinates of a pixel are associated with an LUT type, or the like), such as a reference LUT designation image shown in FIG. 2, in advance. In the example of FIG. 2, LUT (2) that is a result of learning using 6-dimensional 32-gradation feature vectors is referred to with respect to a ground region $E_2$ having little color change in background pixels. In addition, LUT (1) that is a result of learning using 3-dimensional 128-gradation feature vectors is referred to with respect to a sky region $E_1$ having considerable color change in background pixels.

<Extraction Processing>

Figure 3:
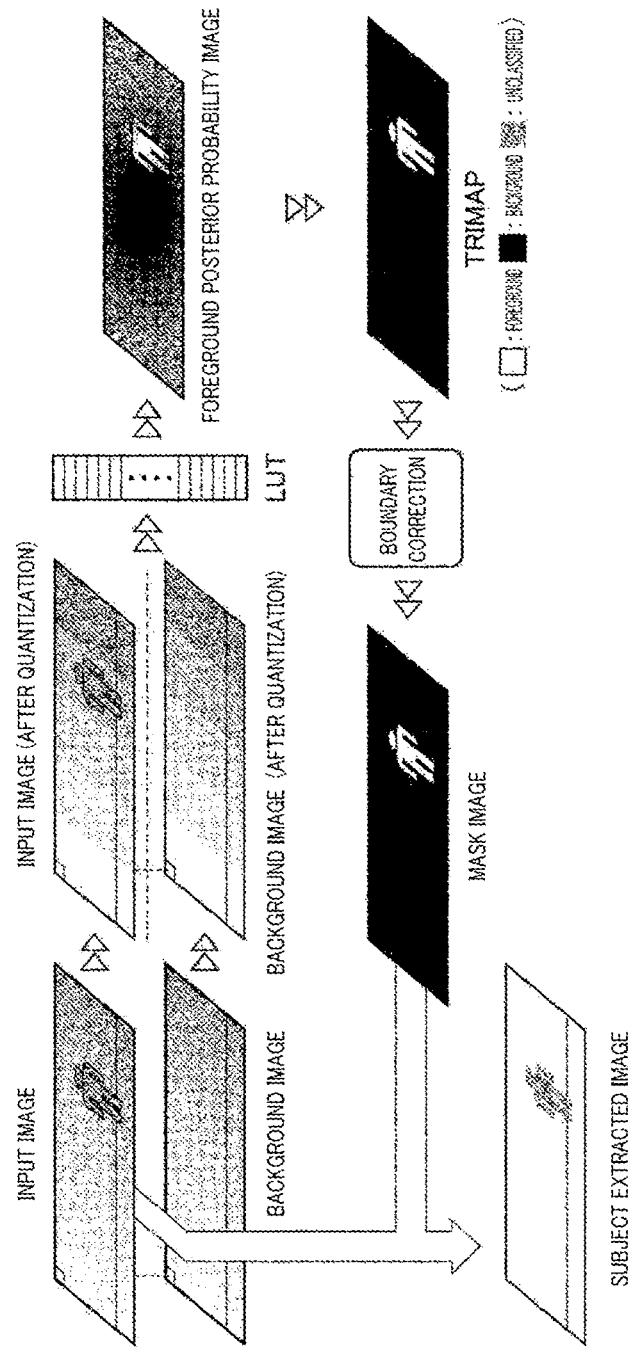
FIG. 3 is an explanatory diagram of extraction processing in an embodiment of the present invention.

FIG. 3 is an explanatory diagram of extraction processing (real-time processing) in an embodiment of the present invention. As shown in this figure, the following processes 2-1 to 2-7 are performed in the extraction processing.

In the process 2-1, the same quantization as that during LUT generation is performed in advance on a background image.

In the process 2-2, the same quantization as that during LUT generation is performed on an input image.

In the process 2-3, combinations of pixels having the same coordinates in the quantized input image and the background image are input to an LUT generated in the learning processing and outputs are acquired. This is performed on all pixels in the images to acquire a foreground posterior probability image representing a degree of similarity to the foreground.

In the process 2-4, a region having a high foreground posterior probability is set as the foreground and a region having a low foreground posterior probability is set as the background with reference to the foreground posterior probability image. Thereafter, a three-value image (TRIMAP) in which a region having a probability indicating ity as to whether it is the foreground or background and a region that is the boundary between the foreground and the background are set as unclassified regions is generated. That is, when the foreground posterior probability image is binarized by setting an arbitrary threshold value, there are cases in which the foreground posterior probability image includes small noise or omission of a subject region. Accordingly, identification accuracy is improved by setting a range of values having posterior probabilities indicating ambiguity and performing boundary correction processing thereon.

In the process 2-5, rapid boundary correction processing is performed on unclassified regions of the generated TRI-MAP. As such rapid boundary correction processing, the technology disclosed by Hiromu Miyashita, Kouta Takeuchi, Hidenobu Nagata, and Akira Ono in "Fast Image Segmentation for 4K Real-time Video Streaming", IEICE Tech. Rep., (Technical Committee on MVE), 117(73), pp. 189-190 (June 2017) can be used.

In the process 2-6, a subject extracted image is output by masking the input image with a mask image generated through the boundary correction processing.

In the process 2-7, the processes 2-2 to 2-6 are repeatedly performed to realize real-time process for a moving image.

<Image Processing Device>

Figure 4:
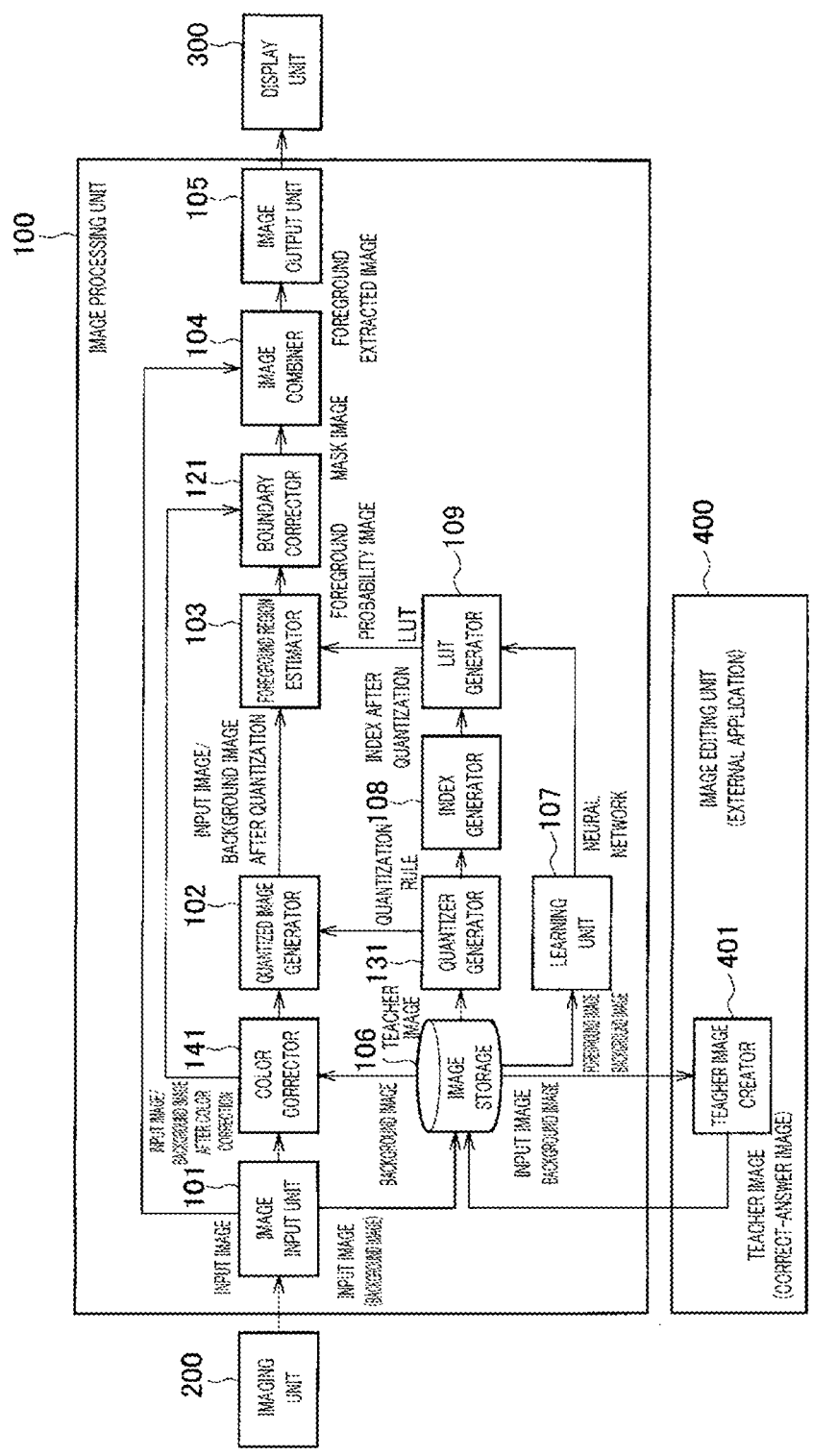
FIG. 4 is a block diagram showing a configuration of an image processing device in an embodiment of the present invention.

FIG. 4 is a block diagram showing a configuration of an image processing device in an embodiment of the present invention. The image processing device includes an imaging unit 200, an image processing unit 100, an image editing unit 400, and a display unit 300. The imaging unit 200 is a camera or the like which images a target. The image processing unit 100 is a computer or the like which performs image processing on an image from the imaging unit 200. The image editing unit 400 is an external application or the like which edits an image from the image processing unit 100. The display unit 300 is a display device or the like which displays an image from the image processing unit 100.

Hereinafter, the image processing unit 100 will be described in detail. The image processing unit 100 is a computer or the like which performs image processing on an image from the imaging unit 200. The image processing unit 100 functionally includes an image input unit 101, a color corrector 141, a quantized image generator 102, a foreground region estimator 103, a boundary corrector 121, an image combiner 104, an image output unit 105, an image storage 106, a learning unit 107, a quantizer generator 131, an index generator 108, and an LUT generator 109.

The image input unit 101 is a functional part which receives an image. Specifically, the image input unit 101 receives an image output from the imaging unit 200.

The image storage 106 is a storage device which stores images. Specifically, the image storage 106 stores an input image as an original image of a background image or a teacher image. Otherwise, the image storage 106 stores an image generated by a teacher image creator 401 as a teacher image.

The color corrector 141 is a functional part which performs color correction as necessary. Specifically, the color corrector 141 corrects colors of an input image such that they approach colors of a background image and converts the input image for each frame with a color correction matrix thereof. Alternatively, the color corrector 141 corrects the colors of the background image such that they approach colors of the input image at a certain time and converts the background image with the color correction matrix to improve accuracy of background differences after illumination change.

The quantizer generator 131 is a functional part which determines a quantization rule. Specifically, the quantizer generator 131 determines a quantization rule for appropriately compressing feature vectors of an image in an imaged scene that is a target with reference to an input image and a teacher image. Here, it is assumed that the quantization rule of the quantizer generator 131 is that the number of gradations of given feature vectors is 32 gradations at equal intervals.

The quantized image generator 102 is a functional part which performs quantization of feature vectors of an image. Specifically, the quantized image generator 102 applies the quantization rule generated by the quantizer generator 131 to both an input image and a background image and performs quantization of feature vectors of each image.

The learning unit 107 is a functional part which performs learning. Specifically, the learning unit 107 constructs a network from combinations of feature vectors of three types of images: a foreground-only image; an image excluding a foreground; and a background image. Here, it is assumed that the learning unit 107 uses an NN as a machine learning algorithm which performs nonlinear identification.

The index generator 108 is a functional part which generates an index. Specifically, the index generator 108 applies the quantization rule generated by the quantizer generator 131 to all combinations of multidimensional feature vectors and generates indices of an LUT.

The LUT generator 109 is a functional part which generates an LUT. Specifically, the LUT generator 109 generates an LUT by inputting quantized indices to a network and sequentially arranging outputs thereof.

The foreground region estimator 103 is a functional part which estimates a region similar to a foreground region. Specifically, the foreground region estimator 103 applies an LUT to an input image and a background image to estimate a similarity to a foreground region. Meanwhile, when the foreground region estimator 103 does not use an LUT, the foreground region estimator 103 estimates a region similar to a foreground region by using conventional background differences or (when a stereo image is acquired from the imaging unit) stereo parallax.

The boundary corrector 121 is a functional part which performs boundary correction processing. Specifically, the boundary corrector 121 classifies regions similar to a foreground acquired from the foreground region estimator 103 into a foreground, a background, and one or more types of unclassified regions. Thereafter, the boundary corrector 121 performs boundary correction processing for identifying whether a target pixel corresponds to the foreground or the background on the unclassified regions with reference to input pixels and background pixels neighboring the target pixel.

The image combiner 104 is a functional part which combines images. Specifically, the image combiner 104 combines a binary image (mask image) classified as the foreground and the background and the input image to acquire an image having only the foreground extracted therefrom.

The image output unit 105 is a functional part which outputs an image to the display unit 300.

According to this image processing device, in extraction of a subject based on the background difference method using an image captured by a fixed camera as a target, it is possible to accurately estimate a foreground and a background using an NN even when feature vectors of pixels of the subject and the background are close. Further, it is also possible to perform rapid subject extraction processing on a moving image by replacing network arithmetic operation processing with LUT reference processing.

Figure 5:
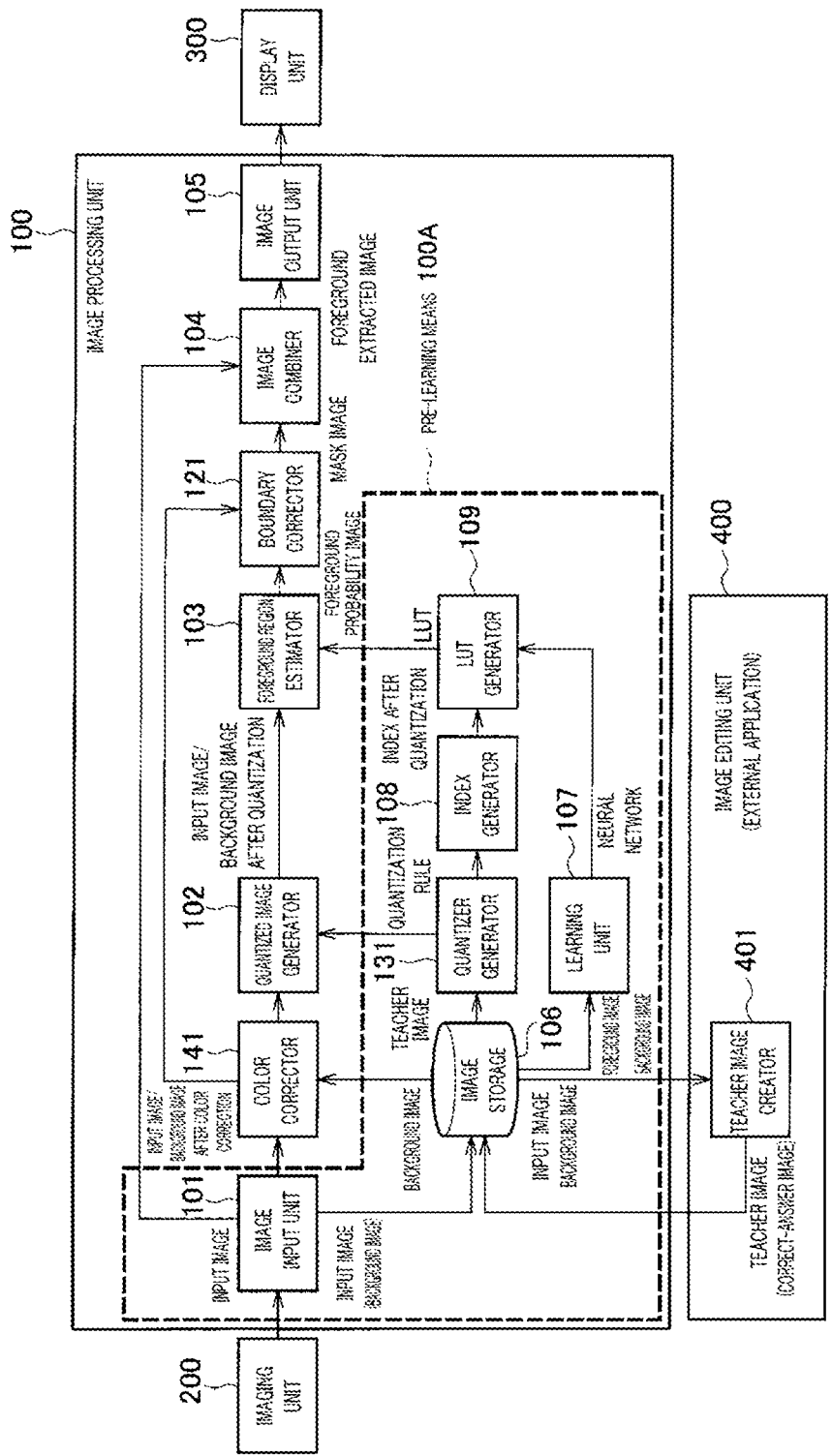
FIG. 5 is a block diagram showing a configuration of an image processing device in an embodiment of the present invention.

Meanwhile, a functional part composed of the image input unit 101, the image storage 106, the quantizer generator 131, the learning unit 107, the index generator 108, and the LUT generator 109 is referred to as a pre-learning means 100A (refer to FIG. 5). The pre-learning means 100A is a functional part which performs learning processing (pre-processing).

Figure 6:
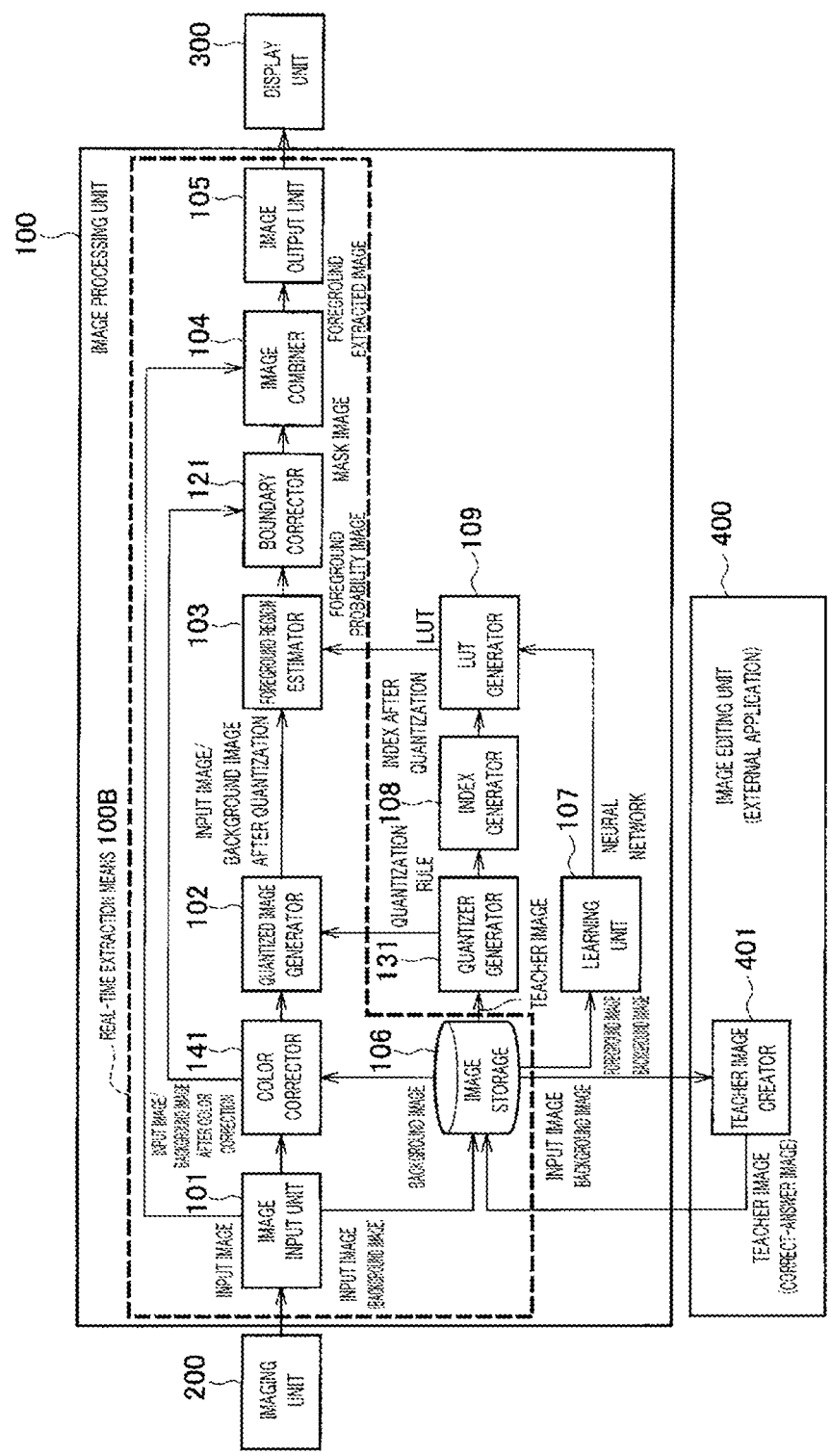
FIG. 6 is a block diagram showing a configuration of an image processing device in an embodiment of the present invention.

In addition, a functional part composed of the image input unit 101, the image storage 106, the color corrector 141, the quantized image generator 102, the foreground region estimator 103, the boundary corrector 121, the image combiner 104, and the image output unit 105 is referred to as a real-time extraction means 100B (refer to FIG. 6). The real-time extraction means 100B is a functional part which performs extraction processing (real-time processing).

Further, there are cases in which a functional part which extracts features for each pixel from an input image and an input image of a different time is referred to as a "feature extractor" in the following description. In addition, there are cases in which a functional part which reduces the number of gradations of features extracted by the feature extractor is referred to as a "quantization unit".

—Supplement—

Figure 7:
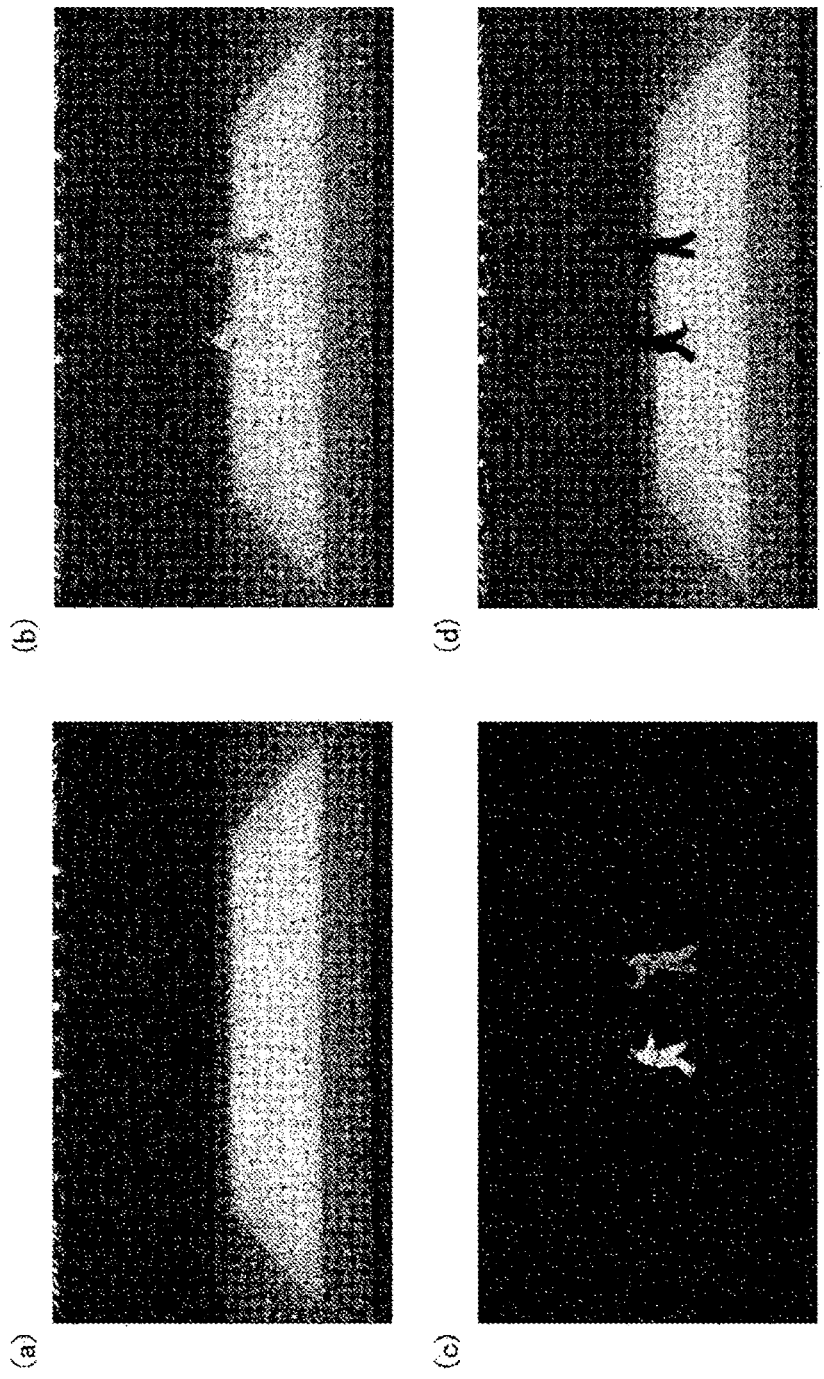
FIG. 7 is a diagram showing specific examples of images in an embodiment of the present invention.

Meanwhile, a background image stored in the image storage 106 is an image output from the imaging unit 200 in which a foreground (subject) was not captured at a certain time in the past. An input image is an image currently output from the imaging unit 200. An image excluding a foreground is an image from which at least the foreground that is an extraction target has been excluded. A specific example of a background image is shown in FIG. 7(a), a specific example of an input image is shown in FIG. 7(b), a specific example of a foreground-only image is shown in FIG. 7 (c), and a specific example of an image excluding a foreground is shown in FIG. 7 (d).

In addition, although a region is classified as any one of one or more types of unclassified regions in the above description, a conventional method of selectively applying a plurality of boundary correction methods may be used when two types of unclassified regions are set. As such a conventional method, there is Mariko Yamaguchi, Hidenobu Nagata, and Akira Ono's "Adaptive matching method for rapid and precise subject extraction", 2017 IEICE General Conference, no. D-11-29, March 2017.

Figure 8:
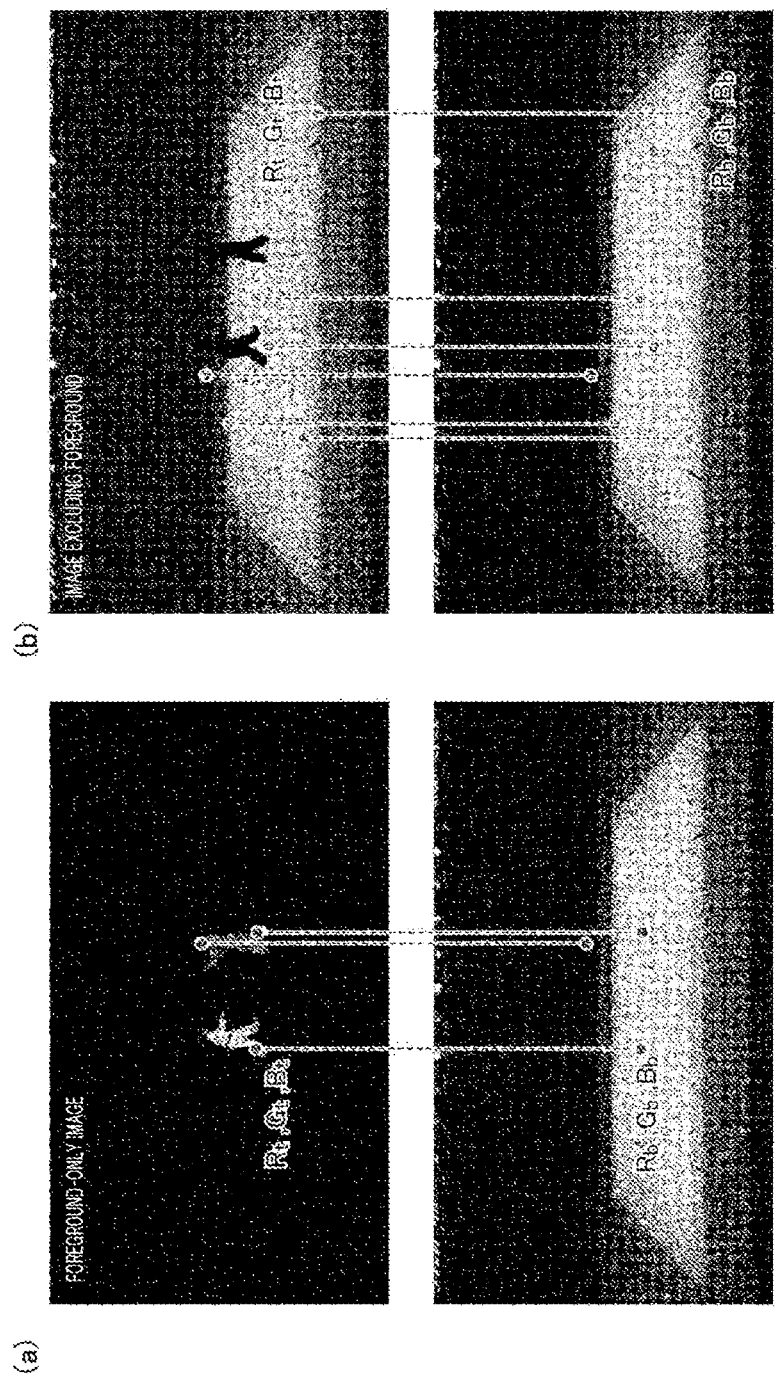
FIG. 8 is a diagram showing specific examples of teacher data in an embodiment of the present invention.

Further, the teacher image creator 401 which manually creates a teacher image from an input image and a background image is included in the image editing unit 400 such as an external application. The "teacher image" includes teacher data of foreground pixels and teacher data of background pixels. A specific example of teacher data of foreground pixels is shown in FIG. 8 (a). The teacher data of foreground pixels is a combination of $R_f$, $G_f$, $B_f$, $R_b$, $G_b$ and $B_b$ and as many pieces of teacher data as the number of pixels that are effective in a foreground-only image are prepared. A specific example of teacher data of background pixels is shown in FIG. 8 (b) The teacher data of background pixels is a combination of $R_f$, $G_f$, $B_f$, $R_b$, $G_b$ and $B_b$ and as many pieces of teacher data as the number of pixels that are effective in an image excluding a foreground are prepared.

Next, processing of the index generator 108 will be supplementarily described. A case in which feature vectors are "vectors composed of RGB of background pixels and RGB of foreground pixels in an 8-bit RGB image" is conceived. In this case, all 6-dimensional feature vectors are $256^6$ rows as shown in FIG. 9. In such a case, the index generator 108 generates $32^6$ 6-dimensional feature vectors of FIG. 10 with reference to a quantization rule. A combination of such feature vectors is called an index. Meanwhile, a combination of feature vectors called an index because a row of an input corresponding to the combination in an LUT can be identified by referring to feature vectors (a, b, c, d, e, f) as follows.

$$\text{index}=a*32^5+b*32^4+c*32^3+d*32^2+e*32^1+f*32^0$$

Figure 11:
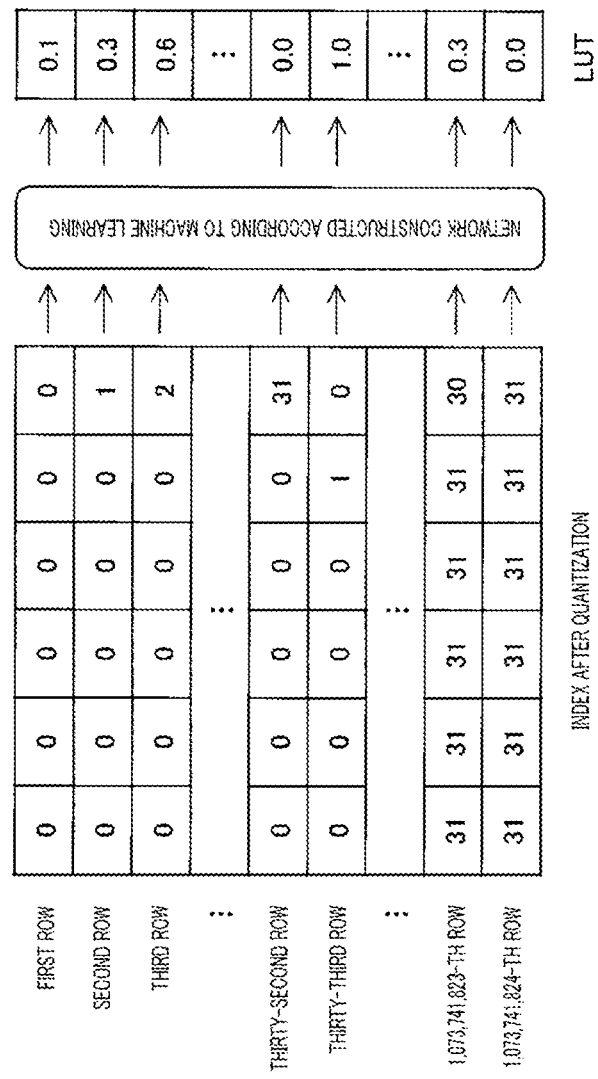
FIG. 11 is an explanatory diagram of LUT generation processing in an embodiment of the present invention.

The LUT generator 109 sequentially inputs indices to a network constructed according to learning and sequentially arranges outputs acquired from the network to create a matrix ($32^6$ row 1 column) as shown in FIG. 11. This matrix is a final LUT.

<Flow of Learning Processing>

Figure 12:
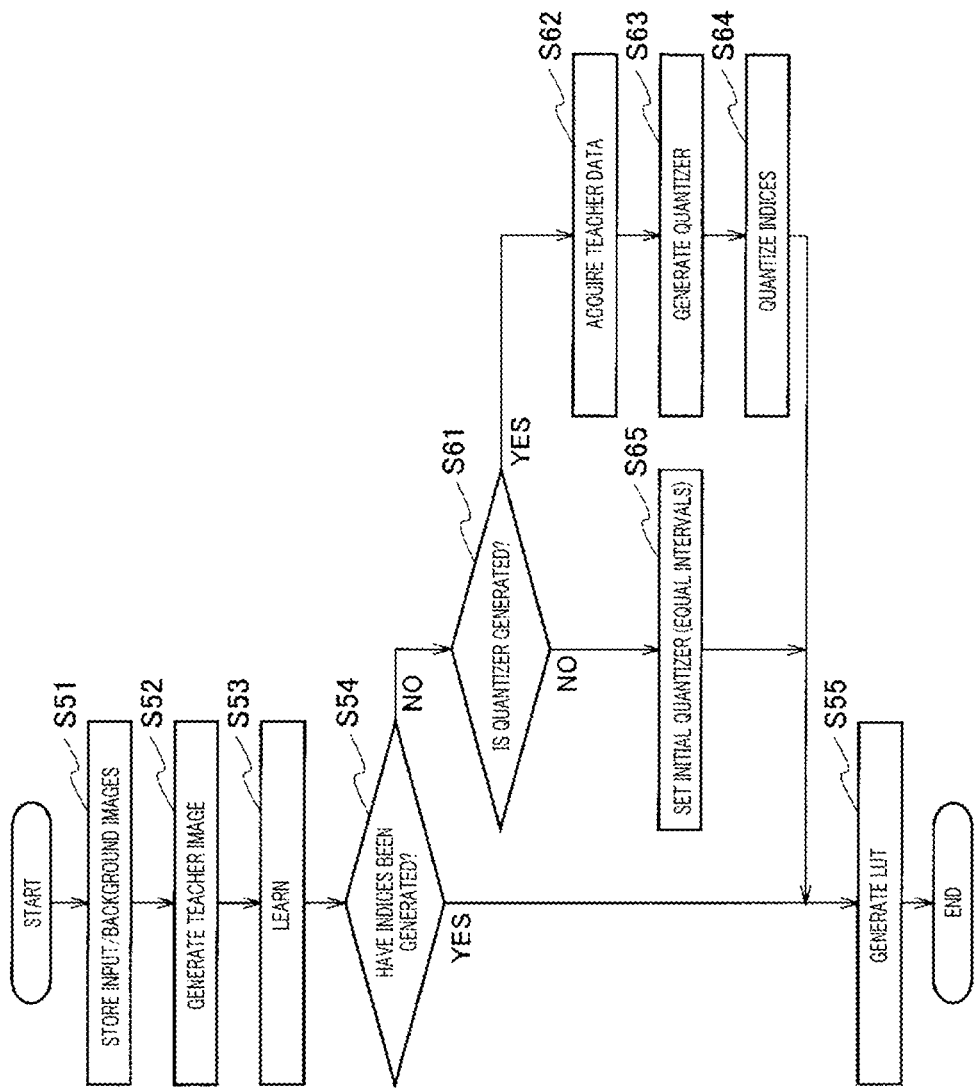
FIG. 12 is a flowchart showing a flow of learning processing in an embodiment of the present invention.

FIG. 12 is a flowchart showing a flow of learning processing in an embodiment of the present invention. An operation subject of steps S61 to S65 of this flowchart is the quantizer generator 131.

First, the image storage 106 stores input/background images and generates a teacher image and the learning unit 107 learns the teacher image (step S51→S52→S53). Here, when indices have been generated, the LUT generator 109 generates an LUT (step S54→S55). On the other hand, when indices have not been generated, the LUT generator sets an initial quantizer (equal intervals) and generates an LUT if a quantization rule is not generated by the quantizer generator 131 (step S54→S61→S65→S55). Further, if a quantization rule is generated by the quantizer generator 131 when indices have not been generated, the quantizer generator 131 acquires teacher data and generates a quantizer, the index generator quantizes indices, and the LUT generator generates an LUT (step S54→S61→S62→S63→S64→S55).

<Flow of Extraction Processing>

Figure 13:
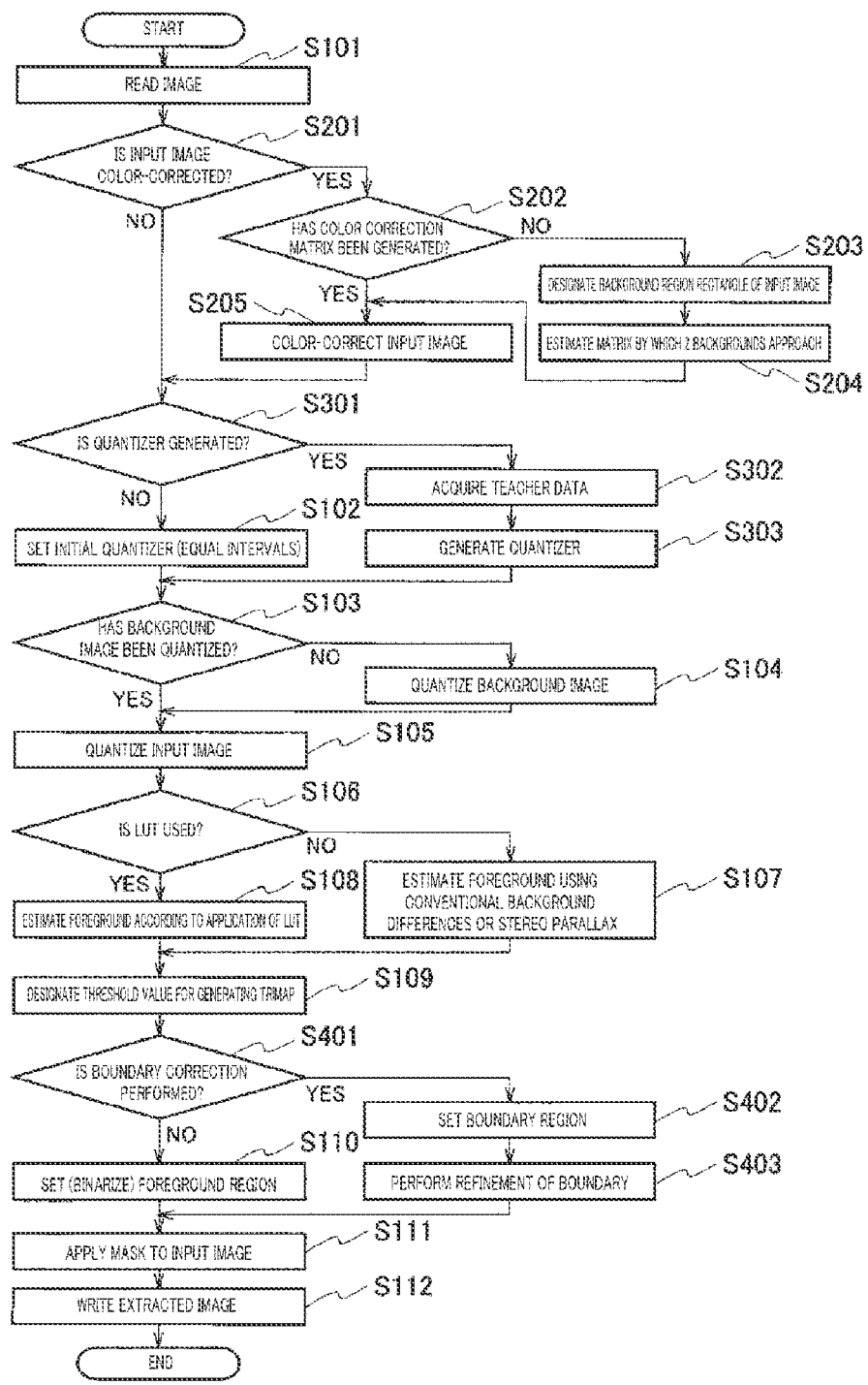
FIG. 13 is a flowchart showing a flow of extraction processing in an embodiment of the present invention.

FIG. 13 is a flowchart showing a flow of extraction processing in an embodiment of the present invention. An operation subject of steps S201 to S205 of this flowchart is the color corrector 141, an operation subject of steps S301 to S303 is the quantizer generator 131, an operation subject of steps S106 to S109 is the foreground region estimator 103, and an operation subject of steps S401 to S403 is the boundary corrector 121.

First, the image input unit 101 reads an image (step S101). Here, in a case in which an input image is color-corrected, when a color correction matrix has not been generated, the color corrector 141 designates a background region rectangle of the input image, estimates a matrix by which 2 backgrounds approach and color-corrects the input image (step S201→S202→S203→S204→S205). Further, when a color correction matrix has been generated in a case in which the input image is color-corrected, the color corrector 141 color-corrects the input image (step S201→S202→S205).

On the other hand, in a case in which the input image is not color-corrected, when a quantization rule is not generated by the quantizer generator 131, the quantized image generator 102 sets an initial quantizer (equal intervals) (step S201→S301→S102). Further, when a quantization rule is generated by the quantizer generator 131 in a case in which the input image is not color-corrected, the quantizer generator 131 acquires teacher data and generates a quantizer set to deviations of feature vectors of foreground pixel teacher data and background pixel teacher data (Step S201→S301→S302→S303).

Subsequently, when a background image has not been quantized, the quantized image generator 102 quantizes the background image and quantizes the input image (step S103→S104→S105). On the other hand, when the background image has been quantized, the quantized image generator 102 quantizes the input image (step S103→S105).

Subsequently, when an LUT is not used, the foreground region estimator 103 estimates a foreground using conventional background differences or stereo parallax and designates a threshold value for generating TRIMAP (step S106→S107→S109). On the other hand, when an LUT is used, the foreground region estimator 103 estimates a foreground according to LUT application and designates the threshold value for generating TRIMAP (step S106→S108→S109).

Subsequently, when boundary correction is performed, the boundary corrector 121 sets a boundary region (generates TRIMAP) and performs refinement of the boundary, the image combiner 104 applies a mask to the input image, and the image output unit 105 performs writing of an extracted image (step S401→S402→S403→S111→S112). On the other hand, when boundary correction is not performed, the boundary corrector 121 sets (binarizes) a foreground region, the image combiner 104 applies a mask to the input image, and the image output unit 105 performs writing of an extracted image (step S401→S110→S111→S112).

<Points>

The following points can be conceived as points of an embodiment of the present invention.

In a latest input image and an input image acquired at a different time, one set of maximum 6-dimensional feature vectors of pixels of the same coordinates is input to an NN such that the NN learns them.

TRIMAP is generated when foreground pixels are estimated according to the NN and combined with boundary correction processing such that a subject region with higher precision can be extracted.

Since the number of arithmetic operations is considerably reduced by making a relationship between inputs and outputs of the NN into an LUT, operations can also be rapidly applied to a moving image for each frame.

<Experiment>

Figure 14:
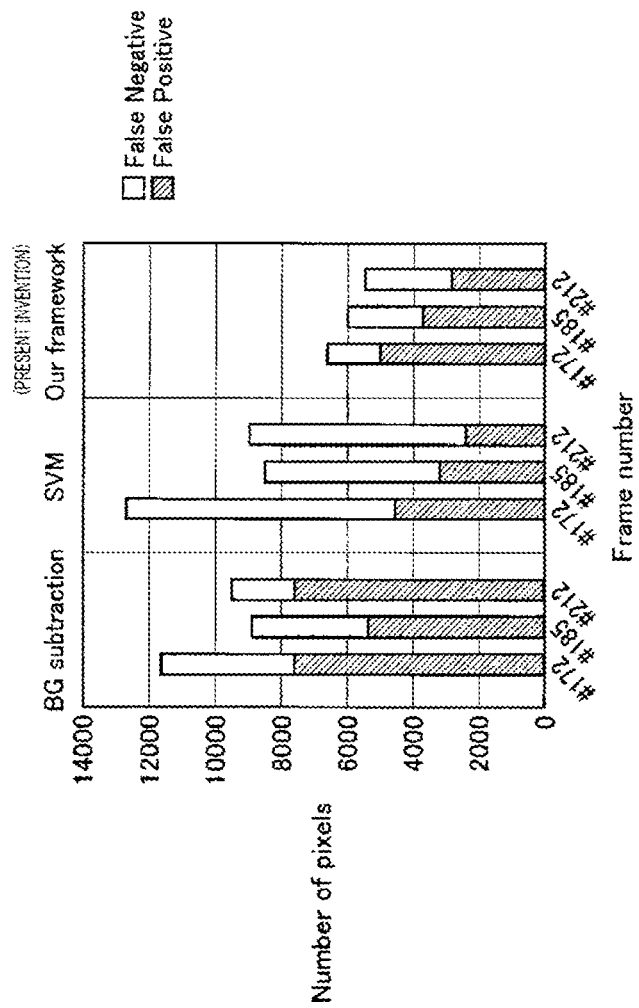
FIG. 14 is a graph showing experimental results of an embodiment of the present invention and a conventional technology.

An accuracy comparison experiment for three subject extractions was performed using an image of a judo game captured using a camera with 4K resolution. These three subject extractions include subject extraction using conventional background differences, subject extraction using a support vector machine (SVM) (machine learning algorithm that performs linear identification), and subject extraction of an embodiment of the present invention (machine learning using an NN). Total numbers of error pixels when subjects were extracted using the respective methods are shown in FIG. 14. As shown in FIG. 14, the embodiment of the present invention obtains the best result of highest accuracy. Particularly, it is ascertained that the head of the subject having a color close to the color of the background, a jugo uniform of the subject having a color close to the color of the floor, and a shadow region generated at the foot of the subject have few error pixels and can be correctly identified. This is conceived that input feature vectors can be identified because they are converted into an appropriate feature space in an NN model. Further, it is ascertained that 4K images can be processed in real time (at a frame rate of 30 FPS or higher) with respect to extraction processing in an embodiment of the present invention.

<Summary>

As described above, the image processing device in an embodiment of the present invention includes a feature extractor, a quantization unit, the learning unit 107, the LUT generator 109, the foreground region estimator 103, and the boundary corrector 121. The feature extractor extracts features of respective pixels from an input image and an input image of a different time. The quantization unit reduces the number of gradations of features extracted by the feature extractor. The learning unit 107 learns combinations of features of pixels through a machine learning algorithm that performs nonlinear identification (e.g., NN) and constructs a network according to machine learning. The LUT generator 109 generates an LUT replacing arithmetic operations of the network constructed by the learning unit 107. The foreground region estimator 103 rapidly estimates similarity of each pixel of the input image to a foreground by referring to the LUT generated by the LUT generator 109. The boundary corrector 121 classifies regions similar to the foreground estimated by the foreground region estimator 103 into the foreground, a background, and an unclassified region including boundary pixels of the foreground and the background and performs boundary correction only on the unclassified region. Accordingly, it is possible to perform accurate and rapid identification even when feature vectors of input pixels and background pixels are close.

Here, the quantization unit may change quantization methods according to features of the input image. Accordingly, it is possible to appropriately reduce the number of feature vectors and curb decrease of identification accuracy of the foreground and background.

In addition, the boundary corrector 121 classifies regions similar to a foreground estimated by the foreground region estimator 103 into the foreground, a background and an unclassified region including boundary pixels of the foreground and the background. Further, the boundary corrector 121 may classify the unclassified region into two or more types of correction target regions according to features near the boundary pixels and change correction methods for the correction target regions. Accordingly, it is possible to acquire an extracted image suitable for features of the boundary.

In addition, the feature extractor may automatically or semi-automatically correct any of an input image and an input image of a different time. Alternatively, the feature extractor may switch the input image of a different time to another image obtained by editing the input image of a different time. Accordingly, it is possible to acquire an extracted image adapted to change in an imaged scene while referring to the same LUT.

In addition, the learning unit 107 may construct a plurality of types of networks having different properties by setting different machine learning algorithms or different machine learning parameters, the LUT generator 109 may generate a plurality of types of LUTs from the plurality of types of networks, and the foreground region estimator 103 may refer to different LUTs for regions of a preset image. Accordingly, it is possible to acquire an extracted image adapted to features of a background of an imaged scene. Meanwhile, "different machine learning" mentioned here also includes a linear identification machine learning algorithm.

In addition, an image processing method in an embodiment of the present invention is a method of extracting features of respective pixels from an input image and an input image of a different time, constructing an NN which estimates a region similar to a foreground for each extracted feature, and deriving similarity of each pixel of the input image to the foreground.

Furthermore, this image processing method may be a method of deriving similarity of each pixel to a foreground, which appropriately reduces the number of feature vectors by changing quantization methods according to features of the input image and rapidly processing arithmetic operation processing of the constructed network through LUT reference processing.

In addition, this image processing method may be a method of deriving similarity of each pixel to a foreground, which rapidly acquires an extracted image in which the boundary of a subject has been refined according to the following method. The following method is a method of classifying derived regions similar to a foreground into the foreground, a background and one or more types of unclassified regions including boundary pixels of the foreground and the background and performing boundary correction to which information on surroundings of pixels of interest is added only on the unclassified regions.

In addition, this image processing method may be a method of deriving similarity of each pixel to a foreground, which obtains robust output results with respect to change in an imaged scene while continuously using the same LUT through the following method. The following method is a method of automatically or semi-automatically correcting any of an input image and an input image of a different time or switching the input image of a different time to another image.

In addition, this image processing method may be a method of deriving similarity of each pixel to a foreground, which obtains output results suitable for a scene through the following method. The following method is a method of constructing a plurality of networks having different properties by switching an input image of a different time to an image obtained by editing the input, image of the different time or an image obtained by editing a mask image of an output result, generating LUTs, and referring to different LUTs for regions of an image.

Meanwhile, an embodiment of the present invention can be realized as not only the above-described image processing device and image processing method but also an image processing program causing a computer to serve as each functional part included in the image processing device. In addition, such a program can be distributed through a recording medium such as a CD-ROM or a transmission medium such as the Internet.

Other Embodiments

While an embodiment of the present invention has been described above, description and drawings constituting a part of the disclosure are not to be understood to limit the present invention. Various substitute embodiments, examples and operation technologies become clear to those skilled in the art from the disclosure.

For example, the image processing device (refer to FIG. 4) described in the embodiment of the present invention may be configured in one hardware or a plurality of hardware according to functions and the number of processes thereof. Further, the image processing device may be realized in an existing image processing system.

The present invention includes various embodiments and the like which are not described herein. Accordingly, the technical scope of the present invention is defined only by matters used to specify the invention according to the claims which are valid from the above description.

REFERENCE SIGNS LIST

100 Image processing unit
101 Image input unit
102 Quantized image generator
103 Foreground region estimator
104 Image combiner
105 Image output unit
106 Image storage
107 Learning unit
108 Index generator
109 LUT generator
121 Boundary corrector
131 Quantizer generator
141 Color corrector
200 Imaging unit
300 Display unit
400 Image editing unit
401 Teacher image creator

The invention claimed is:

1. An image processing device comprising:
a feature extractor, implemented using one or more computing devices, configured to extract features of pixels from an input image and an input image of a different time;
a quantization unit, implemented using one or more computing devices, configured to reduce a number of gradations of the extracted features extracted by the feature extractor;
a learning unit, implemented using one or more computing devices, configured to learn combinations of the features of the pixels through a machine learning algorithm that performs nonlinear identification and constructs a network according to machine learning;
a look-up table (LUT) generator, implemented using one or more computing devices, configured to generate an LUT that replaces arithmetic operations of the network constructed by the learning unit;
a foreground region estimator, implemented using one or more computing devices, configured to estimate similarity of each pixel of the input image to a foreground by referring to the generated LUT; and
a boundary corrector, implemented using one or more computing devices, configured to classify (i) regions similar to the foreground, as estimated by the foreground region estimator, into the foreground, (ii) a background, and (iii) an unclassified region including boundary pixels of the foreground and the background, and perform boundary correction on the unclassified region.

2. The image processing device according to claim 1, wherein the quantization unit is further configured to change quantization methods according to features of the input image.

3. The image processing device according to claim 1, wherein the boundary corrector is further configured to classify the unclassified region into two or more types of correction target regions according to features near the boundary pixels, and change correction methods for the correction target regions.

4. The image processing device according to claim 1, wherein the feature extractor is further configured to automatically or semi-automatically correct any of the input image and the input image of the different time or replace the input image of the different time with another image obtained by editing the input image of the different time.

5. The image processing device according to claim 1, wherein the learning unit is further configured to construct a plurality of types of networks having different properties by setting different machine learning algorithms or different machine learning parameters, wherein the LUT generator is further configured to generate a plurality of types of LUTs from the plurality of types of networks, and wherein the foreground region estimator is further configured to refer to different LUTs for regions of a preset image.

6. An image processing method, performed by a computer, comprising:

extracting features of pixels from an input image and an input image of a different time;

reducing a number of gradations of extracted features;

learning combinations of the features of the pixels through a machine learning algorithm that performs nonlinear identification and constructing a network according to machine learning;

generating a look up table (LUT) that replaces arithmetic operations of the constructed network;

estimating similarity of each pixel of the input image to a foreground by referring to the generated LUT; and classifying (i) regions similar to the foreground into the foreground, (ii) a background, and (iii) an unclassified region including boundary pixels of the foreground and the background, and performing boundary correction on the unclassified region.

7. A non-transitory computer readable medium storing an image processing program, wherein execution of the image processing program causes one or more computers to perform operations comprising:

extracting features of pixels from an input image and an input image of a different time;

reducing a number of gradations of the extracted features;

learning combinations of the features of the pixels through a machine learning algorithm that performs nonlinear identification and constructing a network according to machine learning;

generating an LUT that replaces arithmetic operations of the constructed network;

estimating similarity of each pixel of the input image to a foreground by referring to the generated LUT; and classifying (i) regions similar to the estimated foreground into the foreground, (ii) a background, and (iii) an unclassified region including boundary pixels of the foreground and the background, and perform boundary correction on the unclassified region.

8. The non-transitory computer readable medium according to claim 7, wherein the operations further comprise changing quantization methods according to features of the input image.

9. The non-transitory computer readable medium according to claim 7, wherein the operations further comprise classifying the unclassified region into two or more types of correction target regions according to features near the boundary pixels, and changing correction methods for the correction target regions.

10. The non-transitory computer readable medium according to claim 7, wherein the operations further comprise automatically or semi-automatically correcting any of the input image and the input image of the different time or replacing the input image of the different time with another image obtained by editing the input image of the different time.

11. The non-transitory computer readable medium according to claim 7, wherein the operations further comprise:

constructing a plurality of types of networks having different properties by setting different machine learning algorithms or different machine learning parameters;

generating a plurality of types of LUTs from the plurality of types of networks; and referring to different LUTs for regions of a preset image.

* * * * *